S006224218B1

(12) United States Patent
Turner

(10) Patent No.: US 6,224,218 B1
(45) Date of Patent: *May 1, 2001

(54) BACKSCREEN EDGE CONTOURING FOR OFF-AXIS LARGE FIELD OF VIEW DISPLAYS

(75) Inventor: James A. Turner, Binghamton, NY (US)

(73) Assignee: L-3 Communications Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/656,674

(22) Filed: May 31, 1996

(51) Int. Cl.$^7$ .................................................. G03B 21/28
(52) U.S. Cl. ............................. 353/98; 353/13; 359/451; 434/44
(58) Field of Search ................................ 353/98, 99, 122, 353/82, 10, 13, 28; 359/451, 639, 630, 631; 434/37, 38, 43, 44; 348/36, 39, 121, 123

(56) References Cited

U.S. PATENT DOCUMENTS

| 3,620,592 | * | 11/1971 | Freeman .................................. 353/99 |
| 3,784,742 | * | 1/1974 | Burnham et al. ..................... 359/451 |
| 3,807,849 | * | 4/1974 | Lobb ....................................... 353/10 |
| 3,895,861 | * | 7/1975 | Herndon . |
| 3,973,840 | * | 8/1976 | Jacobs et al. . |
| 4,234,891 | * | 11/1980 | Beck et al. . |
| 5,566,370 | * | 10/1996 | Young .................................. 359/631 |

FOREIGN PATENT DOCUMENTS

WO 96
14713A * 5/1996 (EP) .

* cited by examiner

*Primary Examiner*—William Dowling
(74) *Attorney, Agent, or Firm*—Whitman Breed Abbott & Morgan LLP

(57) ABSTRACT

An off-axis backscreen visual display system having an increased vertical field of view (FOV) is disclosed. The lower edge of the backscreen member in the display system is contoured in accordance with the structure of the aircraft and the observer's point of view. The contouring of the lower edge of the backscreen increases the upward FOV coverage without changing the eyepoint/display relationship.

8 Claims, 2 Drawing Sheets

BACKSCREEN EDGE CONTOURING FOR OFF-AXIS LARGE FIELD OF VIEW DISPLAYS

GOVERNMENT RIGHTS

The present invention is made under a contract with the U.S. government. The government may have rights in this invention.

TECHNICAL FIELD

The present invention relates to display systems employed in aircraft simulator training systems.

BACKGROUND OF THE INVENTION

Various display systems are known for aircraft simulator applications used to train pilots and other aircraft crew members. The simulators allow training in a ground-based facility and attempt to provide simulated experiences and situations which are as close to actual events as possible. One of the drawbacks of present simulator systems is the limited field of view (FOV). The FOV is often insufficient to provide vision in the areas necessary for multiple training tasks, such as landing training and refueling training. These tasks in particular require the largest possible FOV display.

Preferred simulator systems today use an off-axis backscreen/mirror visual display system (OABD) for providing a large field of view display for the pilots and other crew members. The OABD systems use projectors which project an image onto a backscreen member which in turn redirects the image beam onto a collimating mirror. The mirror in turn redirects the beam to the observer's eyepoint.

The vertical FOV of OABD systems is normally limited since the portion of the backscreen that displays the lower portion of the FOV also blocks or occults the observers' upper FOV. Attempts to increase the FOV coverage in the downward direction have adversely affected (that is, decreased) the FOV coverage in the upward direction. Similarly, increases in the upward FOV coverage have decreased the FOV coverage in the downward direction.

Some attempts to overcome these limitations in current OABD system designs have moved the eyepoint of the observer forward and/or downward with respect to the display. Similarly, some systems have instead moved the display in a backward and/or upward direction with respect to the observer's eyepoint. These allow the downward FOV coverage of the backscreen to be increased; however the upward FOV coverage again becomes partially occulted by the backscreen. Moreover, moving the eyepoint or display thusly degrades the collimation (convergence and divergence) and/or distortion characteristics of the OABD system. This in turn can lead to significant problems with eyestrain or the ability to use the system.

It is an object of the present invention to provide an improved OABD system for use in aircraft simulator applications. It is another object of the present invention to provide an improved OABD system with an increased vertical field of view.

It is another object of the present invention to provide an OABD system with an increased vertical field of view which does not decrease the field of view in other directions or areas. It is still further object of the present invention to provide an improved OABD system which increases the field of view but does not degrade the collimation and/or distortion characteristics of the display.

SUMMARY OF THE INVENTION

The present invention overcomes the problems noted above with respect to known off-axis backscreen/mirror visual display systems (OABD) and provides a system which meets the above-stated objects. In particular, the present invention provides an OABD system having an increased vertical field of view (FOV) while preserving the collimation and distortion characteristics of the display.

The system includes a projector for projecting an image beam, a collimating mirror, and a backscreen interposed between the projector and the mirror for redirecting the image beam onto a surface of the collimating mirror. The collimated mirror in turn redirects the image beam to the observer's eyepoint. In accordance with the invention, the lower edge of the backscreen is contoured to approximate the field of view limits of an aircraft sill line. This contouring increases the usable vertical FOV without changing the geometrical relationship of the eyepoint, backscreen and mirror.

Preferably, a demarcation line is determined and used as a guide for contouring the bottom edge of the backscreen. Other additional occultation areas, such as those caused from other aircraft parts, both inside and outside of the cockpit, may also be taken advantage of and used to add or delete additional material to the backscreen during contouring. Also, for OABD systems that support dual eyepoints, the contouring takes into consideration the field of view of both the pilot/observer and the co-pilot/crew member.

The areas of the backscreen which are removed by the contouring of the bottom edge increase the vertical field of view in those areas.

These and other features, benefits and advantages of the present invention will become more apparent from the following detailed description of exemplary embodiments of the invention, as further illustrated in the accompanying drawings and as set forth in the appended claims.

BEST MODE(S) FOR CARRYING OUT THE INVENTION

Figure 1:
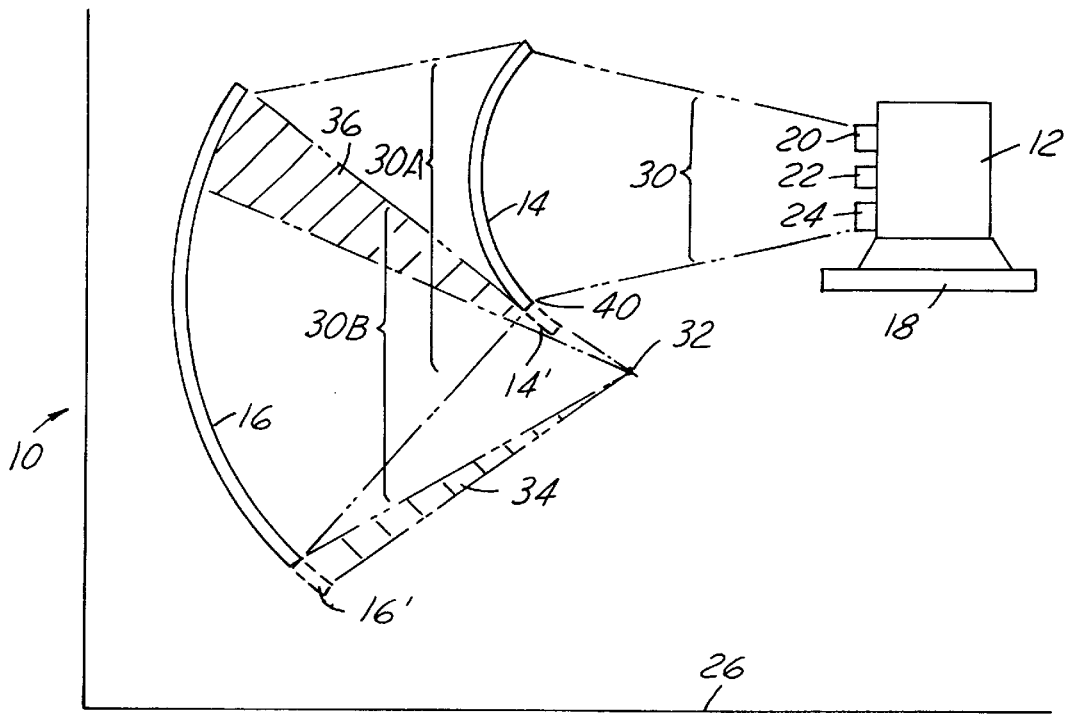
FIG. 1 is a schematic diagram of an OABD system.

FIG. 1 is a schematic diagram illustrating an off-axis backscreen/mirror visual display system (OABD) The OABD system is generally referred to by the reference numeral 10. The system 10 includes a projector system 12, a backscreen member 14, and a collimating mirror 16. The projector 12 is mounted on a projector platform 18 and includes red, green and blue image projectors 20, 22 and 24, respectively. The OABD system is housed in a simulator apparatus 26.

In use, the OABD system 10 projects an image beam 30 onto the backscreen member 14. The backscreen member 14 in turn redirects the image beam as beam 30a onto the collimating mirror 16. The mirror 16 in turn redirects the image beam as beam 30b to the observer's eyepoint 32.

The vertical field of view (FOV) of OABD systems are normally limited due to the fact that the portion of the backscreen member 14 that displays the lower portion of the field of view also occults the upper FOV of the observer. This means that if an attempt is made to increase the FOV coverage in the downward or upward directions, the corresponding FOV coverage in the upper or lower directions, respectively, decreases.

The effect of extending the backscreen and mirror to secure a better FOV is shown in FIG. 1. If the backscreen 14 is extended in a downward direction to the position shown by reference numeral 14', and correspondingly, the collimating mirror 16 is extended to the position indicated by reference numeral 16', then the lower or downward field of view coverage is increased by the beam area 34. However, extending the backscreen and collimating mirror in that manner also results in a decrease in the upper FOV coverage due to occultation by the extended portion of the screen. The portion of upper FOV which would be occulted is shown by the beam area 36.

Some current OABD system designs have attempted to improve upon this situation by moving either the observer's eyepoint or the display closer together or further apart. Other designs have moved the observer downwardly relative to the display or vice-versa. These embodiments allow the downward field of view of the backscreen to be increased. However, these design attempts also result in the field of view coverage in an upward direction to once again be partially occulted by the backscreen.

Moreover, there is a significant problem with moving the eyepoint 32 further forward and/or downwardly from its normal position. These movements degrade the collimation (convergence and divergence) and/or distortion characteristics of the OABD system. This in turn can lead to significant problems with eyestrain to the observer and/or the observer's ability to use the system.

In accordance with the present invention, the lower edge 40 of the backscreen 14 is shaped or contoured to eliminate certain material. Portions of the lower edge of the backscreen are removed so that the upward vertical field of view of the observer and/or crew member can be increased in the simulator without moving either the eyepoint, the backscreen or the mirror.

Figure 3:
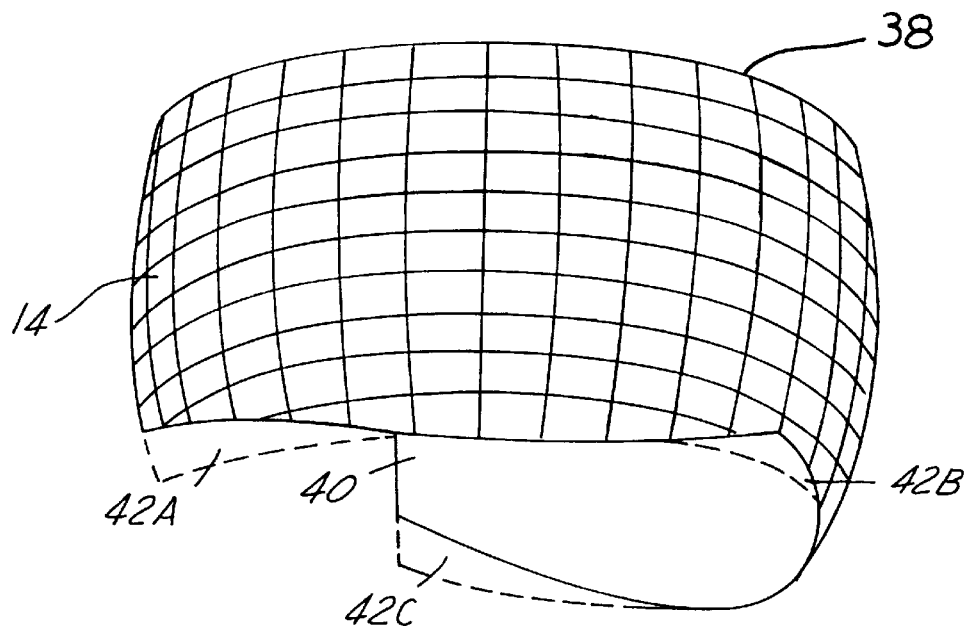
FIG. 3 is a schematic diagram of a backscreen for an OABD system illustrating contouring in accordance with the present invention.

A contoured backscreen 14 is shown in FIG. 3. The backscreen has a curved or rounded shape (when viewed from above) with an elongated curved upper edge 38 and a corresponding elongated curved lower edge 40. The lower edge 40 of the backscreen is contoured with sections 42a, 42b and 42c having been removed in order to increase the observer's field of view in those areas.

In this regard, the lower edge of the backscreen is contoured differently depending on whether the observer is viewing the display alone, or whether an observer and crew member are jointly viewing the display. In the backscreen 14 shown in FIG. 3, the bottom edge is contoured as a result of a composite analysis which takes into account the viewing of the display on the collimated mirror by two persons.

Figure 2:
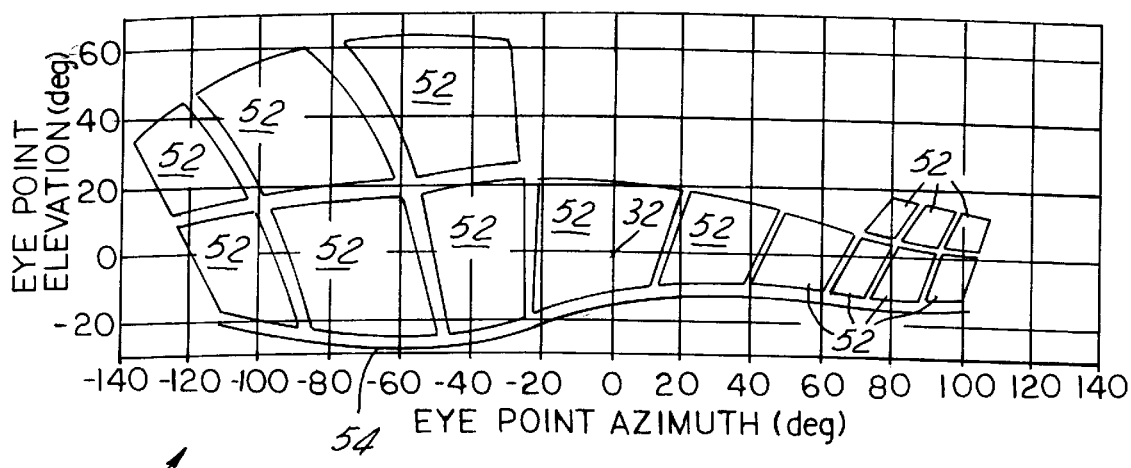
FIG. 2 illustrates a typical field of view of aircraft windows from a pilot/observer's point of view.

A typical field of view of the windows of an aircraft is shown in FIG. 2 and designated by the reference numeral 50. The point on the graph marked "x" and designated by the reference numeral 32 is the straight ahead line of sight of the observer when the observer is located in the left-hand seat of a side-by-side aircraft seating arrangement. Each of the generally rectangular polygons 52 represent the windows of the aircraft as viewed by the pilot or observer with his eyes leveled at eyepoint 32. A co-pilot or crew member sitting along side the pilot would see a field of view which is a mirror image of the field of view 50 as shown in FIG. 2.

Also in FIG. 2, line 54 is the demarcation line for the depicted aircraft. This is the practical limit of the pilot's field of view in the vertical downward direction when only the windows are taken into account. In an actual cockpit of an aircraft, the pilot's view out of the windows also may be partially occulted by the glareshield and instrumentation and there is no reason to provide a FOV for that subject matter.

The FOV 50 is generated by conventional computer software used in visual systems design, although it also can be generated by use of a transit system.

Figure 4:
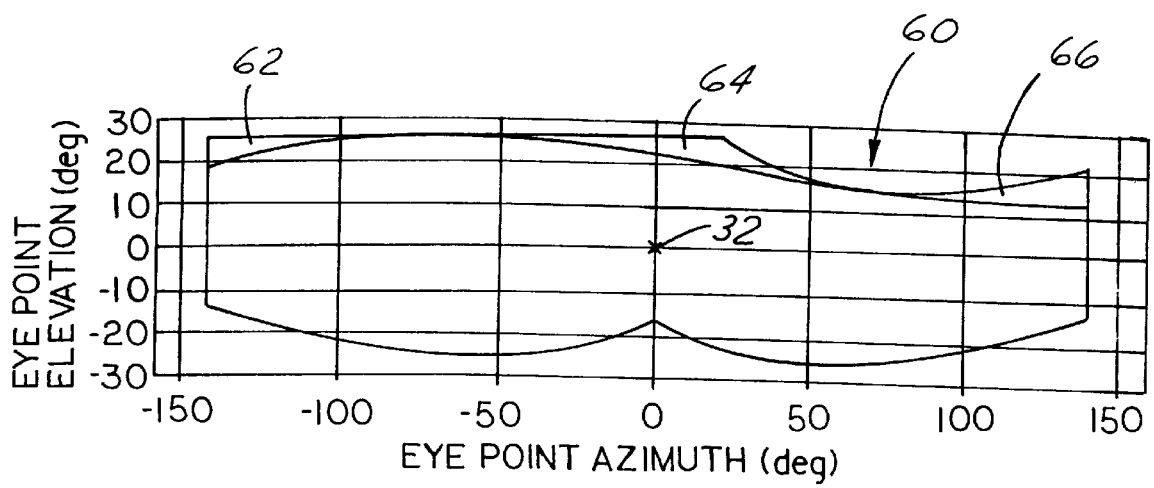
FIG. 4 is a chart showing the effective field of view of an OABD visual system with a contoured backscreen.

The FOV boundaries 60 as viewed from the pilot/observer's eyepoint is shown in FIG. 4. The FOV boundaries viewed by a co-pilot or crew member would be a mirror image of the FOV 60 shown in FIG. 4. The FOV 60 is the image that the pilot/observer can see on the collimating mirror 16 which is projected from the backscreen 14.

As shown in FIG. 4, the contouring of the lower edge 40 of the backscreen 14 allows the field of view 60 to have additional viewing areas 62, 64 and 66. This contouring could be the elimination of areas 42a, 42b and 42c, as shown in FIG. 3. A view of areas 62, 64 and 66 would not be possible without contouring and thus eliminating the areas 42a, 42b and 42c on the backscreen 14.

By contouring the lower edge of the backscreen to the field of view as limited by the aircraft structure, the backscreen edge contouring in accordance with the present invention provides a means to increase the upward field of view without having to change the eyepoint/display relationship. This preserves the collimation and distortion characteristics of the display.

The demarcation line 54 shown in FIG. 2 is used as a guide to contour the bottom edge of the backscreen 14. Since nothing outside the airplane is visible to the pilot or co-pilot below the demarcation line 54, there is no reason to display information below that elevation.

It is also important to note that there may be additional occultation from other aircraft parts, both inside and outside of the cockpit (i.e., fuselage, glare shield, etc.). These also can be taken into account in designing or developing the field of view from the pilot and/or co-pilots' eyepoint.

As mentioned above, for OABD systems that support dual eyepoints, the contouring takes into account both the pilot/observer and the co-pilot/crew members' fields of view.

The present invention economically solves the problem of providing a large vertical field of view while at the same time maintaining vergence and distortion performance.

While the best modes for carrying out the invention have been described in detail, those familiar with the art to which this invention relates will recognize various alternative designs and embodiments for practicing the invention as defined by the following claims.

What is claimed is:

1. An off-axis backscreen visual display system having an increased vertical field of view, comprising:

a projector system for projecting an image beam:

a collimating mirror;

a backscreen interposed between said projector system and said mirror for redirecting the image beam onto a surface of the collimating mirror, the collimating mirror in turn redirecting the image beam to the eyepoint of an observer viewing said system;

the backscreen having a width and a height, the height of the backscreen being the distance between an upper edge and a lower edge surface of said backscreen, said lower edge surface being contoured such that the height varies across the width of the backscreen.

2. The system as set forth in claim 1 wherein the lower edge of the backscreen is contoured to increase the vertical field of view of both said observer and another aircraft crew member.

3. The invention of claim 1 wherein the backscreen provides a field of view at least as high as 25° in elevation from approximately −137° to approximately 25° azimuth relative to a field of view centered at 0° azimuth and 0° elevation.

4. The invention of claim 3 wherein the backscreen provides a field of view that decreases from approximately 25° in elevation at approximately 25° azimuth to approximately 17° elevation at 50° azimuth relative to a field of view centered at 0° azimuth and 0° elevation.

5. The invention of claim 4 wherein the backscreen provides a field of view that increases from approximately 17° in elevation at approximately 50° azimuth to approximately 21° elevation at 135° azimuth relative to a field of view centered at 0° azimuth and 0° elevation.

6. The invention of claim 1 wherein the backscreen provides a field of view that decreases from approximately 25° in elevation at approximately 25° azimuth to approximately 17° elevation at 5° azimuth relative to a field of view centered at 0° azimuth and 0° elevation.

7. The invention of claim 1 wherein the backscreen provides a field of view that increases from approximately 17° in elevation at approximately 50° azimuth to approximately 21° elevation at 135° azimuth relative to a field of view centered at 0° azimuth and 0° elevation.

8. A method for increasing the vertical field of an off-axis backscreen visual display system comprising the steps of:

projecting an image beam from a projector system onto a backscreen member, the backscreen having width and a height, the height of the backscreen being the distance between an upper edge and a lower edge surface of said backscreen;

redirecting the image beam from said collimating mirror the surface of a collimating mirror;

redirecting the image beam from said collimating mirror to the observer's eyepoint; and contouring the lower edge of the backscreen member such that the height varies across the width of the backscreen.

* * * * *